P. DHÉ.
FRONT DISCHARGE CHAMBER OF MELTING FURNACES.
APPLICATION FILED AUG. 15, 1919.
1,361,754.
Patented Dec. 7, 1920.
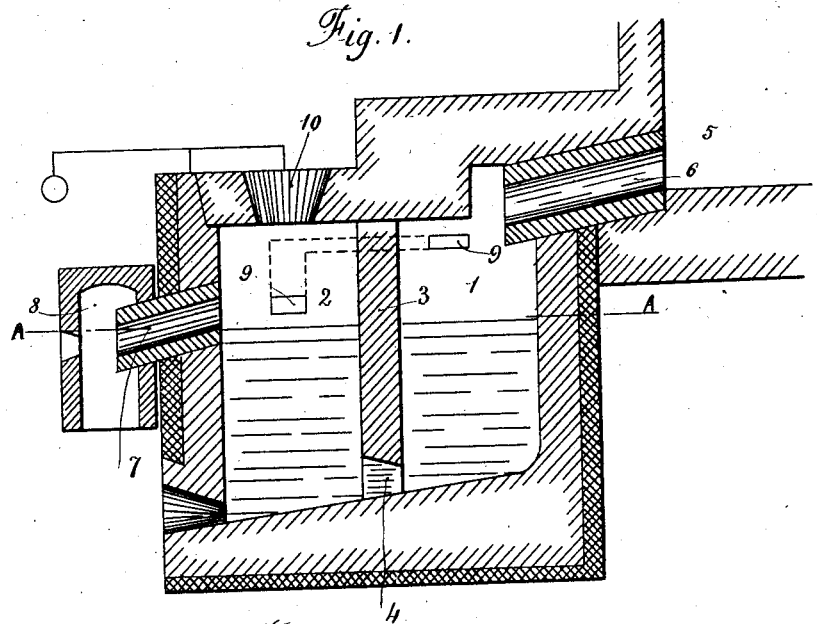
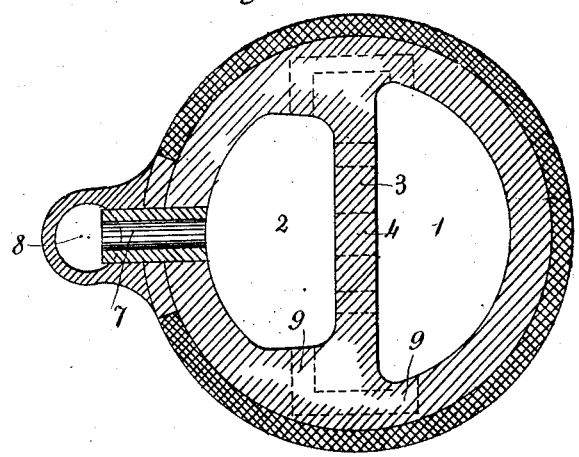
INVENTOR
Paul Dhé
BY
ATTORNEYS

UNITED STATES PATENT OFFICE.

PAUL DHÉ, OF PARIS, FRANCE.

FRONT DISCHARGE-CHAMBER OF MELTING-FURNACES.

1,361,754.    Specification of Letters Patent.    Patented Dec. 7, 1920.

Application filed August 15, 1919. Serial No. 317,792.

*To all whom it may concern:*

Be it known that I, PAUL DHÉ, a citizen of the Republic of France, residing at 42$^{ter}$ Rue Notre Dame des Champs, Paris, France, have invented new and useful Improvements in the Front Discharge-Chambers of Melting-Furnaces, of which the following is a specification.

This invention relates to an arrangement of front discharge chamber applicable to melting furnaces generally serving for the melting of materials such as metal, glass, volcanic rock, and fusible clay.

The discharge chamber is divided, in a manner known more particularly in glass making, into two compartments in communication with each other at their lower part, the first of the said compartments receiving the melted material which issues from the melting furnace and allowing it to be freed from impurities and gas bubbles which it may contain, while the second compartment receives the decanted material and has a tap hole placed at a suitable level.

According to the invention the two compartments of the discharge chamber, or at least one of them, are closed so that there is a certain pressure above the melted material, while suitable means are provided for causing the said pressure to be varied in one or the other of the compartments; this arrangement allows of increasing or decreasing the outflow.

The outflowing material may in certain cases be heated by hot gases conducted into the second compartment; the said gases are, preferably, furnished by the melting furnace and conducted through the first compartment before reaching the second compartment.

The accompanying drawing represents by way of example one form of construction of the front discharge chamber.

Figure 1 is a vertical section and

Fig. 2 is a horizontal section on the line A, A Fig. 1.

The front discharge chamber is divided into two compartments 1 and 2 by a partition 3.

This partition is provided at its lower part with an aperture 4.

The melted material flows from the melting furnace 5 into the compartment 1 through an outflow passage 6.

It decants into this compartment 1, (the gas bubbles become disengaged and the impurities rise to the surface) the pure material passes into the compartment 2 through the aperture 4, then flows through an outflow passage 7 placed at a lower level than that of the outflow passage 6.

The compartments 1 and 2, or at least one of them, are closed so that a certain pressure may be maintained above the melted material.

A valve 10, or other suitable means allows of regulating the pressure of the gases and consequently of decreasing, increasing, and even stopping for some moments and then reëstablishing the flow of the melted material as required. This arrangement is particularly useful when running the material into molds passing in a line in succession beneath the outflowing material.

It may, in certain cases, be of advantage to heat the outflowing material with hot gas. For this purpose the outflow passage 7 extends into a drum 8 into which are introduced the hot gases from the melting furnace, conducted through flues 9 in the compartment 2, by preference after having passed into the compartment 1.

Claims:

1. The combination with a melting furnace having a bottom outflow passage; of a front discharge chamber therefor comprising a body divided transversely into two compartments placed in communication at the upper part, said outflow passage leading into the top of one of said compartments, the other compartment being provided near its upper part with an outflow aperture, at least one of said compartments being closed at its upper part, and means adapted to allow of modifying the pressure of the gases in one of said compartments in order to cause the delivery of the purified material through the outflow aperture to be varied as desired, said means including a small aperture in the top thereof and a valve coöperating with said aperture.

2. A front discharge chamber for melting furnaces having a bottom outflow aperture, comprising a chamber divided into two compartments placed in communication at the bottom to permit the flow of the material therethrough, said furnace having an outflow aperture leading into the upper part of one of said compartments, a passage in the wall of the chamber at each side, establishing communication between the compartments above the level of the material therein from a higher level in the compartment into which the material is discharged to a lower level in the other compartment, said latter compartment being adapted to allow said molten material to flow outside the discharge chamber and having a small aperture at its upper part, the openings or passages in the wall of the chamber being designed to conduct the hot gases from the first compartment into the second compartment, and a valve adapted to coöperate with the aperture in the top of the second compartment, substantially in the manner as and for the purposes specified.

3. A front discharge chamber for melting furnaces comprising two compartments communicating at the lower part, one of the said compartments being adapted to receive the molten material, and the second being adapted to allow the said material to flow outside the discharge chamber, and having an aperture at its upper part, one or more passages adapted to conduct hot gases into the first compartment, one or more passages adapted to conduct the said gases from the first to the second compartment, and a valve adapted to allow the opening or closing of the top aperture in the second compartment.

4. A front discharge chamber for melting furnaces comprising two compartments communicating at the lower part, one of the said compartments being adapted to receive the molten material and the second being adapted to allow the outflow of the said material from the discharge chamber, and having an aperture at its upper part, one or more passages adapted to conduct hot gases into the first compartment, one or more passages adapted to conduct the said gases from the first to the second compartment, a valve adapted to allow the opening or closing of the top aperture of the second compartment, a passage adapted to allow the outflow of the molten material from the second compartment and a drum open at its lower part, and designed to surround the said outflow passage so that the molten material remains in contact with the said hot gases while flowing through the said passage.

5. A front discharge chamber for melting furnaces, comprising two compartments communicating at the lower part, one of the said compartments being adapted to receive the molten material and the second being adapted to allow the flow of the said material from the discharge chamber and having an aperture in its upper part, one or more passages adapted to conduct the said gases from the first to the second compartment, a passage adapted to allow the outflow of the molten material from the second compartment and a drum open at its lower part and designed to surround the said overflow passage so that the molten material remains in contact with the said hot gases, while flowing through the said passage.

In testimony, that I claim the foregoing as my invention I have signed my name in presence of two subscribing witnesses.

PAUL DHÉ.

Witnesses:
 CHAS. P. PRESSLY,
 MAURICE RONX.